United States Patent [19]

Cook et al.

[11] 3,729,756
[45] May 1, 1973

[54] FLOTATION ASSEMBLY
[75] Inventors: Sidney D. Cook, Warwick, R.I.; Louie W. Watkins, Jr., Brookline, Mass.
[73] Assignee: Data Packaging Corporation, Cambridge, Mass.
[22] Filed: Feb. 17, 1971
[21] Appl. No.: 116,031

[52] U.S. Cl. .................................. 9/8 R, 166/0.5
[51] Int. Cl. ........................ B63b 21/52, E21b 7/12
[58] Field of Search ................. 9/8; 138/111, 112, 138/113, 149, DIG. 2, DIG. 9; 166/0.5; 248/74 R, 68 R; 61/72.3

[56] References Cited

UNITED STATES PATENTS

| 2,425,033 | 8/1947 | Fletcher | 248/74 R |
|---|---|---|---|
| 2,227,528 | 1/1941 | Adler | 248/74 R |
| 3,151,633 | 10/1964 | Shuman | 138/111 X |
| 3,332,093 | 7/1967 | Skinner et al. | 9/8 R |
| 2,197,728 | 4/1940 | Lee | 248/74 R |
| 2,395,892 | 3/1946 | Lontz | 9/8 R |

*Primary Examiner*—Milton Buchler
*Assistant Examiner*—Gregory W. O'Connor
*Attorney*—Wolf, Greenfield & Sacks

[57] ABSTRACT

A riser pipe, usually used in drilling for oil, has an annular flotation collar positioned about it. This collar comprises a pair of semiannular flotation members each of which includes a semicircular outer shell of fiberglass, a semiannular low density core preferably including a plurality of plastic hollow spheres surrounded by a syntactic foam, and arcuately-shaped clamping means embedded in the core. Passages through one of the semiannular flotation members provide access to the clamping means so that it may be secured to the riser pipe. The clamping means also includes recesses for holding the choke and kill lines in place on opposite sides of the riser pipe and spaced therefrom.

9 Claims, 6 Drawing Figures

Patented May 1, 1973

INVENTOR
Sidney D. Cook, Louie D. Watkin Jr.
BY
Holf, Greenfield + Sacks.
ATTORNEYS

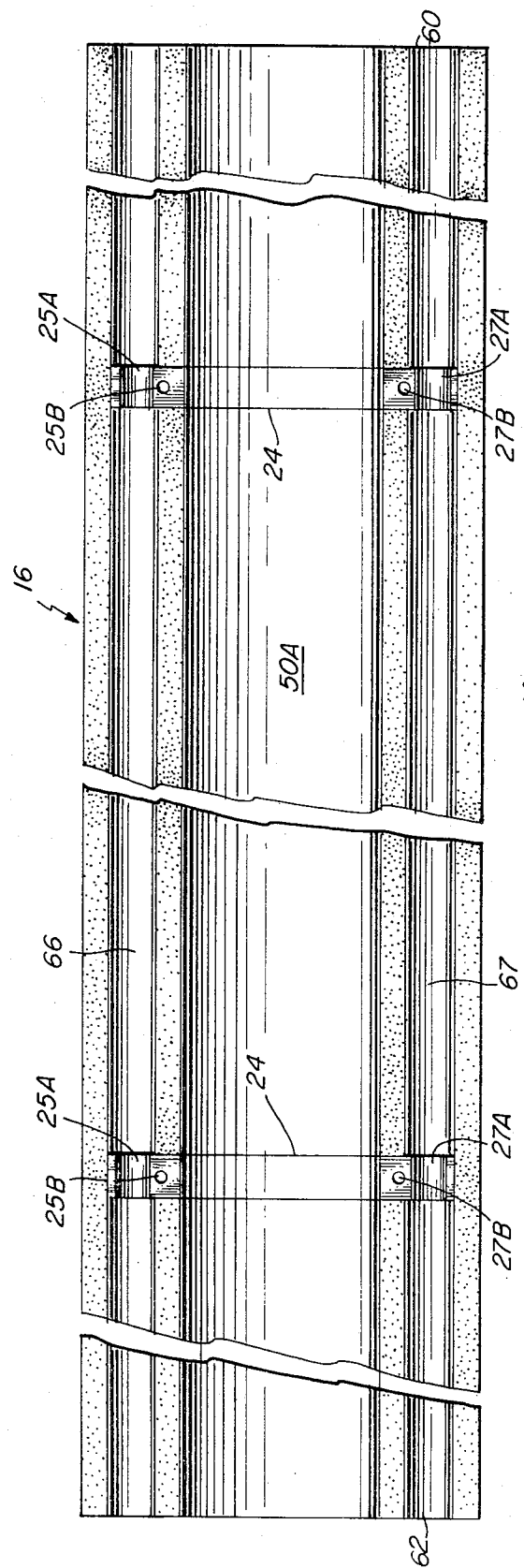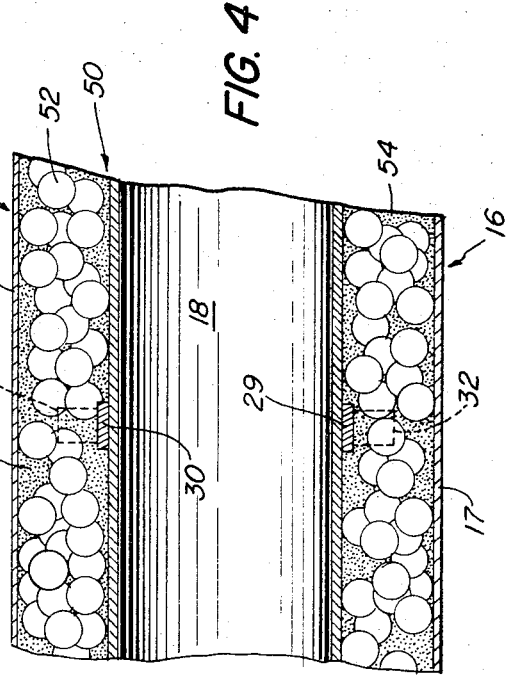

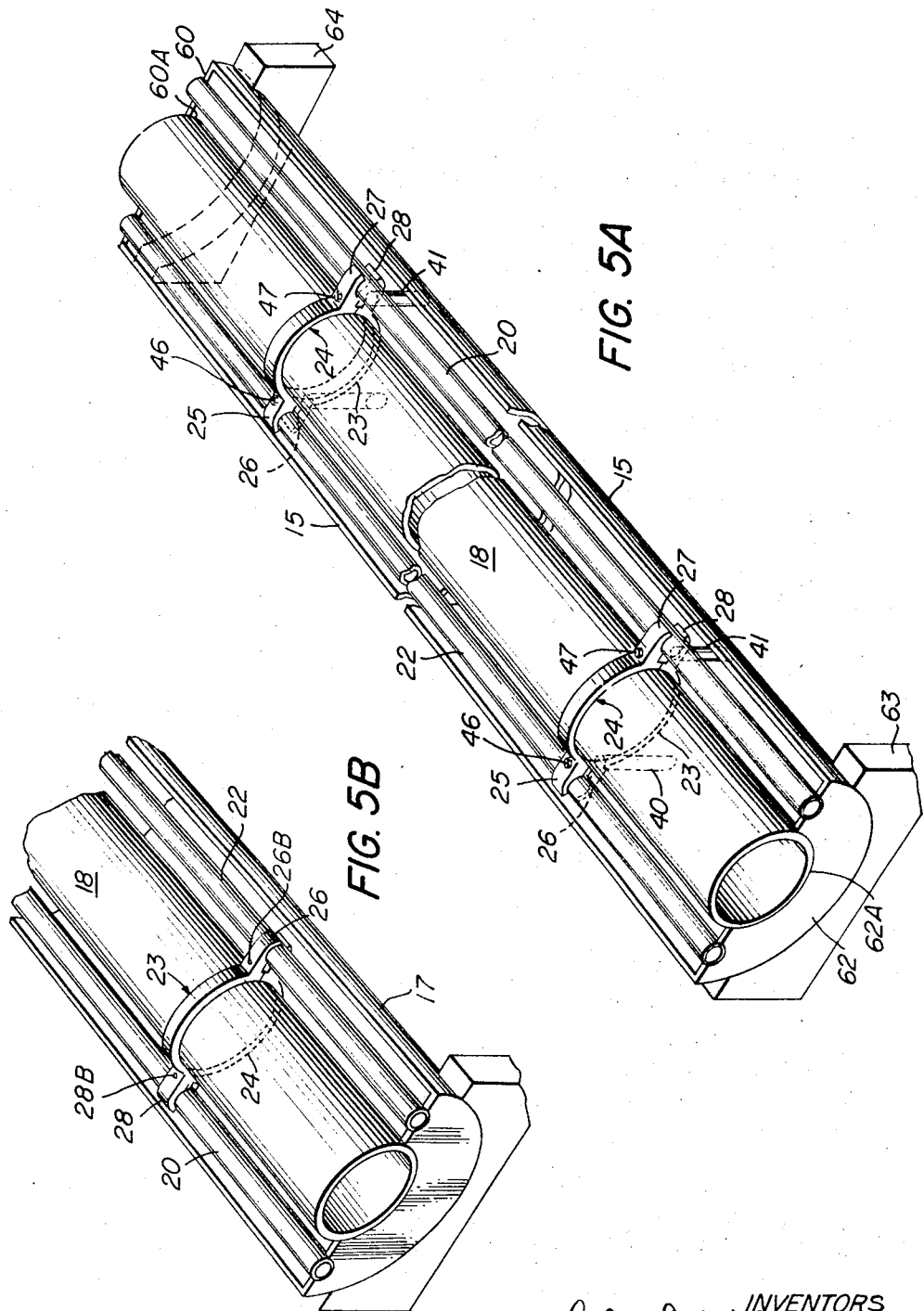

3,729,756

FLOTATION ASSEMBLY

BACKGROUND OF THE INVENTION

The present invention relates to a flotation collar for use about a pipe, preferably a riser pipe usually used in drilling for oil, or the like. The flotation collar comprises a pair of semiannular flotation members affixed about the pipe. The present invention also relates to a method of fabricating such a flotation collar.

In the past, various ways have been devised for buoying up heavy objects such as a metal or ceramic pipe. When an oil deposit, for example, is located under a water filled area it is necessary to run a length of pipe from the surface of the water to the ocean bottom. To compensate for the weight of the pipe, a flotation assembly is usually necessary.

Many of the prior art flotation assemblies have certain disadvantages associated with them. For example, some assemblies include a pre-molded foam core that is bonded directly to the pipe and is completely exposed about its outer surface to the water or other liquid in which it is immersed. This pre-molded core is susceptible to damage during transportation. Also, when the core comprises a composite of foam and small hollow glass spheres, some of the spheres are exposed at the outer surface of the core, and if these spheres are cracked they absorb water. This greatly reduces their effectiveness as a bouyancy material. Also, these cores had an unappealing appearance.

In another known flotation assembly, the core material is fabricated by pouring it into a semi-circular fiberglass shell having end caps that define an enclosure for the core material. The choke and kill lines which are conventionally spaced on either side of the riser pipe are inserted within a precut recess or hole of the fiberglass enclosure, prior to pouring the foam and thus are imbedded at least in part within the core and form part of the semiannular collar. A pair of these collars fabricated in this manner are then bonded to the pipe to provide the final flotation assembly.

With this type of a flotation assembly, the fiberglass outer shell protects the inner core material. However, there are disadvantages associated with this type of an assembly. For example, accurate alignment of the choke and kill lines with reference to the riser pipe is not always possible. Thus, when one section of pipe is mated with the next section which also has the conventional choke and kill lines spaced from it, these lines do not correctly join. Another disadvantage of this assembly is that the flotation collar can not be readily removed from the pipe after it is bonded thereto. Also, the pipes usually have to be transported to the location where the flotation collar is fabricated. Otherwise, the flotation collar has to be attached to the pipe at the utilization site, which is often impractical.

Accordingly, it is an object of the present invention to provide an improved flotation collar designed for use with riser pipes.

It is another object of the present invention to provide a flotation collar that may be secured to the pipe at the utilization site, and that may be readily removed from the pipe if desired.

It is a further object of the present invention to provide a flotation collar having a protective outer shell and an inner core comprising a hardened syntactic foam and a plurality of plastic spheres that provides a composite substance having a very low density, less than that of water.

Still a further object of the invention is to provide a flotation collar including means for accurately spacing the choke and kill lines on opposite sides of the riser pipe.

Still another object of the invention is to provide a flotation collar which includes means for facilitating the hoisting of the collar.

SUMMARY OF THE INVENTION

According to the invention, a flotation assembly for use about a pipe is shown as comprising a pair of semiannular flotation members each including an outer shell, preferably of a fiberglass material, an inner core comprising a plurality of air filled spheres substantially surrounded by an organic polymeric foam, with the inner core having an arcuate inwardly facing surface, and arcuately-shaped clamping means embedded in the inner core and having an arcuate inner surface lying substantially flush with the arcuate inwardly facing surface of the inner core.

In one embodiment of the invention means are provided for securing the pair of semiannular flotation members about the pipe including at least one passage through one of the flotation members to provide access to the clamping means.

Numerous other objects and advantages of the invention will now become apparent upon a reading of the following detailed description in conjunction with the drawings.

BRIEF DESCRIPTION OF THE DRAWINGS

FIG. 3 is a plan view of one of the flotation members with the pipes removed to show the embedded clamping means.

FIG. 4 is a fragmentary longitudinal cross section taken along line 4—4 of FIG. 1 in the vicinity of the clamping means.

FIG. 5A is a perspective view showing the riser pipe and chock and kill lines resting in the fiberglass enclosure just prior to pouring the bouyancy foam for fabricating one-half of the flotation collar.

FIG. 5B is a fragmentary perspective view similar to FIG. 5A and showing the fabrication of the other mating semiannular flotation member.

DETAILED DESCRIPTION

Figure 1:
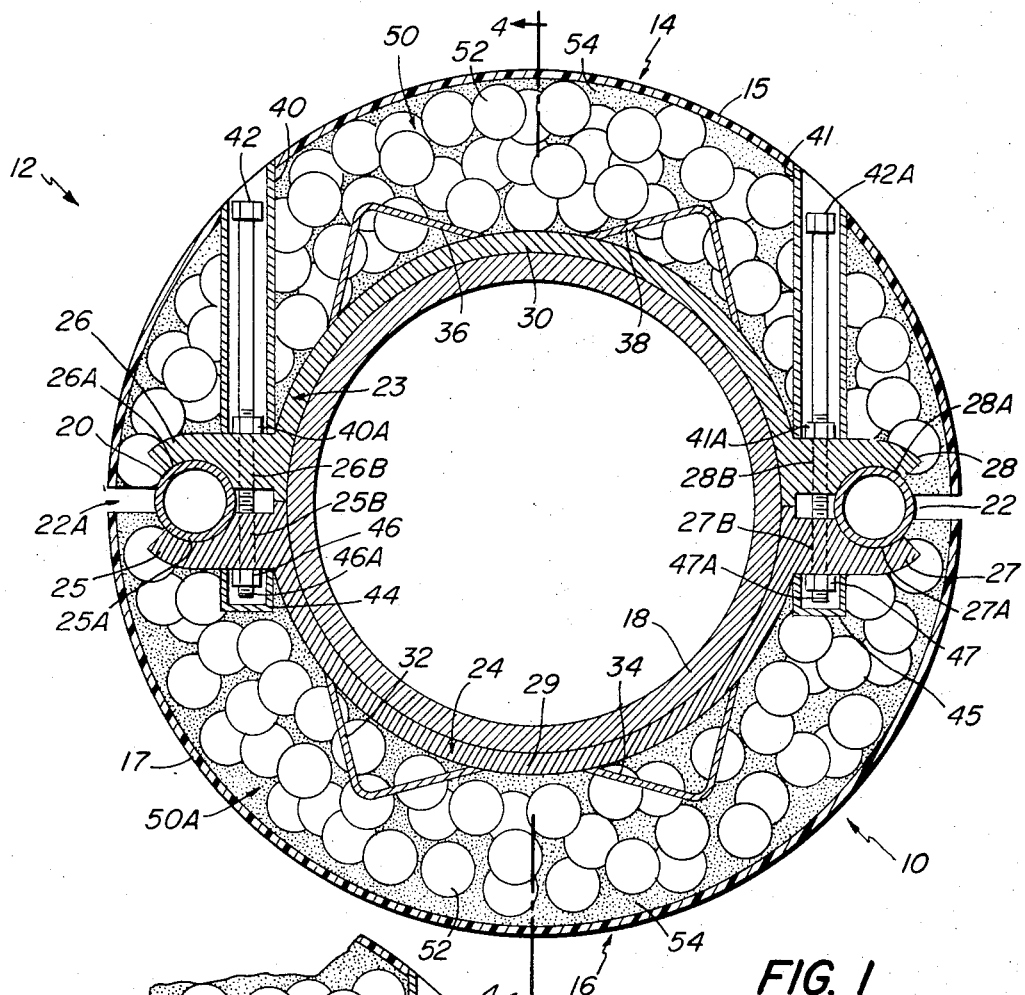
FIG. 1 is a transverse cross-sectional view taken through an assembled flotation collar and pipe at the clamping means.

Referring now to FIG. 1, there is shown a cross-sectional view taken at one of the clamps showing the semiannular flotation members 14 and 16. These members 14 and 16 are joined to form flotation collar assembly 12. The assembly of FIG. 1 also includes riser pipe 18 and choke and kill lines 20 and 22, respectively.

Semiannular flotation member 14 includes an outer semi-circularly shaped shell 15, preferably of fiberglass, an inner low density hardened foam core 50, and an arcuately shaped clamp half 23. Clamp half 23 includes a semi-circular center portion 30 and protruding end flanges 26 and 28. V-shaped anchor straps 36 and 38 are shown welded to the outer surface of central portion 30 of clamp half 23. The straps 36 and 38 are embedded within core 50 and aid in securing clamp half 23 to the hardened foam core 50. End flanges 26 and 28 are provided with recesses 26A and 28A for accommodating lines 20 and 22, respectively. The foam core 50 of member 14 includes a plurality of spherically shaped balls 52 which are preferably fabricated of plastic, and a typical syntactic foam mixture 54 which surrounds the balls 52. These provide a composite foam core that has a relatively low density. One method of forming core 50 is disclosed below with reference to FIG. 5A.

Flotation member 14 also includes a pair of tubes 40 and 41 both of which may be fabricated of polyvinyl chloride. Passages 41 and 42 extend through foam core 50 and have one end passing through a pair of holes in outer shell 15 and the other end terminating at end flanges 26 and 28, respectively. In one embodiment, a circular recess (not shown) may be provided in the top surfaces of flanges 26 and 28 to accommodate one end of tubes 40 and 41, respectively. Elongated bolts 42 and 42A extend through tubes 40 and 41 and have their lower threaded ends 46A and 47A screwed into fixed nuts 46 and 47, respectively. Stop washers 40A and 41A are secured to bolts 42 and 42A near their middle, as shown, and provide for a tight clamping action between clamp halves 23 and 24 when bolts 42 and 42A are tightened into nuts 46 and 47, respectively. Alternatively, holes 26B and 28B, which are provided in flanges 26 and 28 for accommodating bolts 42 and 42A respectively, could be threaded to provide the same clamping action.

FIG. 1 also shows flotation member 16 which is similarly constructed to member 14 but does not include access tubes 40 and 41. Flotation member 16 includes an outer semi-circularly shaped shell 17 preferably of fiberglass, an inner low density hardened foam core 50A substantially identical to core 50 of member 14, and an arcuately shaped clamp half 24. Clamp half 24 includes a semi-circular center portion 29 and protruding end flanges 25 and 27. Anchor straps 32 and 34 are substantially V-shaped and are preferably welded to portion 29. These anchor straps 32 and 34 are embedded in core 50 and secure clamping half 24 relative to core 50. End flanges 25 and 27 also include arcuate recesses 25A and 27A for accommodating lines 20 and 22, respectively. Passages 25B and 27B are provided in flanges 25 and 27 for accommodating the ends of bolts 42 and 42A, respectively. The nuts 46 and 47 are fixed such as by welding to a bottom surface of flanges 25 and 27, respectively. Plastic end caps 44 and 45 may fit over nuts 46 and 47 and allow threaded ends 46A and 47A of bolts 42 and 42A, respectively, to protrude below nuts 46 and 47. End caps 44 and 45 are also provided to keep the core material 50 from filling the nuts 46 and 47 and thus preventing the securing together of the two members 14 and 16. These end caps 44 and 45 may be forced over nuts 46 and 47, respectively, or may be fitted within circular recesses (not shown) in flanges 25 and 27, respectively.

The foam core 50A of member 16 is substantially identical to the core 50 of member 14, and includes a plurality of balls 52 in a composite mixture with a syntactic foam 54. The fabrication of member 16 is discussed in more detail below with reference to FIG. 5B.

Figure 2:
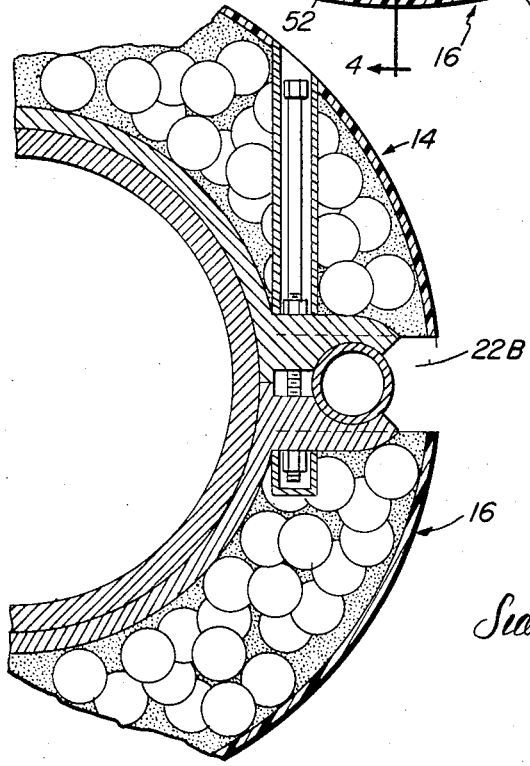
FIG. 2 is a fragmentary cross-sectional view similar to that shown in FIG. 1 of an alternate embodiment of the invention.

In FIG. 2, there is shown a fragmentary cross-sectional view similar to that of FIG. 1 of an alternative embodiment of the invention. In this embodiment a slot 22B is wider than the slot 22A defines between members 14 and 16 of FIG. 1. For applications where a maximum amount of bouyancy is needed the embodiment of FIG. 1 is preferred. However, where maximum bouyancy is not a prerequisite, the embodiment of FIG. 2 may be used. One of the advantages of the FIG. 2 embodiment is that the flotation collar can be fabricated somewhat more easily than the embodiment of FIG. 1. The fiberglass end caps (see FIG. 3), for example, need not have recesses for accommodating the choke and kill lines 20 and 22. While fabricating the collar, the lines 20 and 22 need not be held between the clamp halves 23 and 24 and no recess like recesses 66 and 67 shown in FIG. 3 for lines 20 and 22 need be formed. Also, with the embodiment of FIG. 2 a somewhat less expensive flotation collar can be fabricated as less foam material is needed. Moreover, somewhat more access is provided by way of slot 22A to the clamp halves 23 and 24.

In FIG. 3 a plan view of one of the flotation members 16 is shown. In this drawing, riser pipe 18 and lines 20 and 22 have been removed and the foam core 50A has hardened. Typically, the length of member 16 is eighteen feet, and the two clamp halves 24 are located approximately four feet in from either end of member 16. The clamp halves 24 include the passages 25B and 27B which are adapted to accommodate bolts 42 and 42A. Arcuate recesses 25A and 27A are also depicted and their outer surfaces are substantially flush with recesses 66 and 67, respectively, into which lines 20 and 22 will fit. The clamps may protrude inward about one-quarter inch from the collar surface to compensate for irregularities in the riser pipe outer diameter.

FIG. 4 shows a fragmentary longitudinal cross section taken along line 4—4 of FIG. 1 in the vicinity of clamp halves 23 and 24. Clamping halves 23 and 24 have arcuate center portions 29 and 30, respectively, which are shown in the cross section as touching the outer surface of riser pipe 18. Anchor straps 32 and 36 are embedded within the foam mixture 50, and after the mixture has hardened, they are helpful in providing a strong bond between pipe 18 and flotation collar 12 when the collar is clamped about the pipe.

FIG. 5A illustrates a method of making one-half of the flotation collar, In FIG. 5A, pipe 18 and lines 20 and 22 are shown resting within a fiberglass enclosure defined by end caps 60, 62 and shell 15. Initially, the semi-circular shell 15 is placed on cradle members 63 and 64. The end caps 60 and 62 which may also be fiberglass are then glued or otherwise affixed to the ends of shell 15 to form the fiberglass enclosure. The riser pipe 18, having clamp halves 23 and 24 secured thereto, is positioned with its ends resting in large recesses 60A and 62A of end caps 60 and 62, respectively. The clamp halves 23 and 24 also fit about the choke and kill lines 20 and 22 which in turn rest in smaller recesses in end caps 60 and 62. The pipe 18 and lines 20, 22 can be placed in the enclosure first and the clamps then fitted about them. Alternatively, the pipe and lines could be clamped together first and then rested in the enclosure. The tubes 40 and 41 extend from shell 15 to flanges 26 and 28 of clamping halves 23, as indicated in FIG. 1. The bolts 42 and 42A (not shown in FIG. 5A) may be passed through the tubes 40 and 41 and tightened in nuts 46 and 47 to hold the clamping halves 23 and 24 about pipe 18.

When the clamps are secured about pipe 18 and lines 20 and 22, and they are positioned within recesses of the fiberglass enclosure, a plurality of plastic balls 52 are deposited within the enclosure first. Thereafter these balls are wetted by a typical wetting agent such as a resin so that they stick together and do not substantially move. A conventional low density syntactic foam 54 may then be poured in on either side of pipe 18 until the enclosure defined by shell 15 and caps 60 and 62 is filled. When the composite core 50 has hardened the pipe 18 and lines 20, 22 may be removed, and a configuration similar to that shown in FIG. 3 is formed.

In FIG. 5B there is shown a fragmentary perspective view similar to that shown in FIG. 5A indicating the method of fabricating member 16. The steps for fabricating member 16 are substantially the same as described in connection with FIG. 5A. Clamping halves 23 and 24 are secured about pipe 18 and choke and kill lines 20 and 22. Clamp half 24 is on the bottom side of pipe 18, of course, when fabricating member 16. The plastic end caps 44 and 45 are attached to the fixed nuts 46 and 47 as indicated in FIG. 1 (caps 44 and 45 are hidden from view in FIG. 5B) and a pair of temporary bolts (not shown) like bolts 42, 42A secure the two halves 23 and 24 together by passing through holes 26B, 28B of half 23 and tightening into the nuts 46 and 47, respectively. The foam mixture 50A may then be introduced into the fiberglass enclosure (in the same manner as discussed with reference to FIG. 5A) and be allowed to harden.

The flotation collar of the present invention may also be fabricated without using a heavy riser pipe and the actual choke and kill lines. Instead, a lighter weight pipe may be used. This same pipe could be reused after the mold hardens and thereby eliminate the need for shipping the riser pipes to the location where the collar is made. The collars and pipes may be shipped separately to the utilization site where the collar can then be attached to the pipe. The members 14 and 16 would be secured about pipe 18 by elongated bolts 42 and 42A.

One of the desirable features of the present invention is that when the collar and pipes are assembled at the utilization site, the lines 20 and 22 are accurately spaced from pipe 18 by the clamping means including halves 23 and 24. These halves 23 and 24 can be made substantially identical one to the next. The recesses in end caps 60, 62 can be made slightly larger than the lines 20, 22 to provide for some play when the clamps are tightened about pipe 18 and lines 20, 22. Thus when two sections of riser pipe are joined the lines 20 and 22 associated with each pipe section will join accurately. In the embodiment of FIG. 5A, for example, the clamp halves 23, 24 determine pipe to line spacing and not the recesses in the end caps 60, 62.

Another feature of this invention is that the members 14 and 16 can readily be provided with means helpful in hoisting these members. For example, a pair of bolts similar to bolts 42, 42A could be inserted in tubes 40, 41 respectively, for joining members 14 and 16. These bolts would have an eyelet at their outer (exposed) end through which a hook or other hoisting device could pass. In an embodiment that uses two clamping means, four such bolts would be provided. In an alternative embodiment, the bolts 42, 42A could be made longer than indicated in FIG. 1. The hoisting means could then be provided with a clamping jaw that would grab the top portion of each bolt below its hexagonal head and lift the collar in that manner. The enlarged head would prevent the jaw from slipping off the bolt.

In addition to the embodiments discussed herein, numerous other embodiments and modifications thereof are contemplated as falling within the spirit and scope of the present invention.

What is claimed is:

1. A bouyancy assembly for use about a pipe comprising;
    a pair of arcuate wall members adapted to define an annulus,
    each arcuate wall member including,
        an outer shell of a fiberglass material,
        an inner core comprising a plurality of air-filled spheres substantially surrounded by an organic polymeric foam,
        said inner core having an arcuate inwardly facing surface,
        arcuately-shaped clamping means imbedded in said inner core and having an arcuate inner surface lying substantially flush with the arcuate inwardly facing surface of said inner core,
        and anchoring means including at least one V-shaped metal member secured to said clamping means and imbedded in said inner core.

2. A bouyancy assembly as set forth in claim 1 and further comprising means for securing said pair of arcuate wall members one to the other thereby defining the slotted annulus,
    and means for providing access to said securing means and said clamping means.

3. A bouyancy assembly as set forth in claim 2 wherein said clamping means comprises a pair of clamping halves each including at least one outwardly extending protrusion at one end having a hole therein for accommodating said securing means.

4. A bouyancy assembly as set forth in claim 3 wherein said means for providing access includes at least one hollow tube extending through one of said wall members from said outer shell to said clamping means.

5. A bouyancy assembly as set forth in claim 4 wherein sand securing means comprises
    a threaded nut secured to one of said clamping halves and in alignment with the hole of said one half,
    and an elongated bolt adapted to fit in said tube and through the holes in another clamping half and to be threadedly engaged with said nut.

6. A bouyancy assembly as set forth in claim 5 wherein each said clamping half includes two outwardly extending protrusions at its ends each having a hole therein, and wherein said means for providing access includes two hollow tubes extending both through one of said wall members from said outer shell to the holes in said clamping halves, respectively.

7. A bouyancy assembly as set forth in claim 5 further comprising sealing means including a hollow housing adapted to fit over said nut and providing a space for an end of said bolt when said wall members are joined.

8. A bouyancy assembly as set forth in claim 1 wherein said anchoring means includes a pair of V-shaped straps having their opposite ends secured to said clamping means.

9. A conduit-like flotation assembly comprising:
a fluid-carrying pipe,
a pair of arcuate wall members adapted when positioned about the pipe to define an annular collar for the pipe,
each said arcuate wall member including,
an outer shell of a fiberglass material,
an inner core comprising an organic polymeric foam having a density less than that of water,
said inner core having an arcuate inwardly facing surface,
arcuately-shaped clamping means imbedded in said inner core and having an arcuate inner surface lying substantially flush with the arcuate inwardly facing surfaces of said inner core,
and anchoring means secured to said clamping means and imbedded in said inner core,
said clamping means having protruding end flanges having concave recesses for accommodating second and third pipes disposed on opposite sides of said fluid-carrying pipe wherein said second and third pipes are of smaller diameter than said fluid-carrying pipe, said protruding end flanges being configured to expose a portion of said smaller diameter pipes when said collar is formed.

* * * * *